(12) United States Patent
Moser et al.

(10) Patent No.: US 7,597,002 B2
(45) Date of Patent: Oct. 6, 2009

(54) DIAMAGNETIC LEVITATION SYSTEM

(75) Inventors: Roland Moser, Lausanne (CH); Jan Sandtner, Oberdorf (CH); Francois Barrot, Chavannes (CH)

(73) Assignee: Ecole Polytechnique Federale de Lausanne (EPFL), Lausanne (CH)

( * ) Notice: Subject to any disclaimer, the term of this patent is extended or adjusted under 35 U.S.C. 154(b) by 329 days.

(21) Appl. No.: 10/526,272

(22) PCT Filed: Sep. 2, 2003

(86) PCT No.: PCT/CH03/00596

§ 371 (c)(1),
(2), (4) Date: Apr. 12, 2005

(87) PCT Pub. No.: WO2004/020942

PCT Pub. Date: Mar. 11, 2004

(65) Prior Publication Data

US 2006/0162452 A1    Jul. 27, 2006

(30) Foreign Application Priority Data

Sep. 2, 2002    (CH)    .................... PCT/CH02/00480

(51) Int. Cl.
*G01P 15/16*    (2006.01)
*G01C 9/06*    (2006.01)

(52) U.S. Cl. ............... 73/514.18; 33/366.12; 73/504.08

(58) Field of Classification Search ............... 73/382 R, 73/514.18, 514.19, 514.01, 504.08; 33/366.12
See application file for complete search history.

(56) References Cited

U.S. PATENT DOCUMENTS

| 3,512,852 | A | 5/1970 | North |
| 3,626,364 | A | 12/1971 | Simon et al. |
| 5,396,136 | A | 3/1995 | Pelrine |
| 5,925,956 | A | 7/1999 | Ohzeki |
| 6,361,268 | B1 * | 3/2002 | Pelrine et al. ............ 414/749.2 |
| 6,799,462 | B1 * | 10/2004 | Berstis ..................... 73/514.31 |
| 6,898,970 | B2 * | 5/2005 | Berstis ..................... 73/382 R |

FOREIGN PATENT DOCUMENTS

GB    1 232 465    5/1971

OTHER PUBLICATIONS

Patent Abstracts of Japan, vol. 015, No. 291, Jul. 24, 1991 & JP 03 103086, Apr. 30, 1991.
International Search Report.

* cited by examiner

*Primary Examiner*—John E. Chapman
(74) *Attorney, Agent, or Firm*—Nixon & Vanderhye P.C.

(57) ABSTRACT

The invention concerns an inertial sensor or an actuator based on diamagnetic levitation, said inertial sensor or actuator comprising support means serving as main support body for an inertial sensor or for an actuator, a two dimensional array of permanent magnets and a diamagnetic element facing the said array characterized in that said diamagnetic material constitutes the inertial mass or the moving part of the actuator.

9 Claims, 7 Drawing Sheets

$$X = [(i_C + i_D) - (i_A + i_B)]/(i_A + i_B + i_C + i_D)$$
$$Y = [(i_A + i_D) - (i_B + i_C)]/(i_A + i_B + i_C + i_D)$$

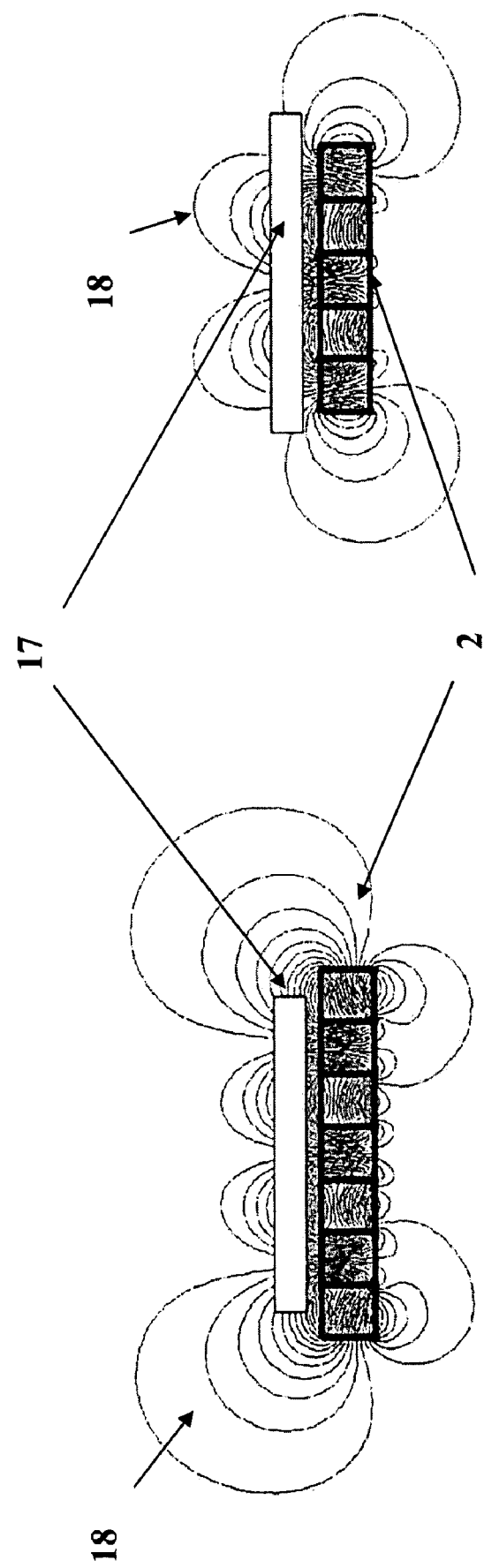

DIAMAGNETIC LEVITATION SYSTEM

This application is the US national phase of international application PCT/CH2003/000596 filed 2 Sep. 2003 which designated the U.S. and claims benefit of PCT/CH02/00480, dated 2 Sep. 2002, the entire content of which is hereby incorporated by reference.

FIELD OF THE INVENTION

The present invention relates to non-contact systems based on diamagnetic levitation.

BACKGROUND OF THE INVENTION

Current inertial sensing systems such as accelerometers, gravimeters and inclinometers are based on the relative displacement between an inertial mass and the base of the instrument when the base is subject to an external perturbation (vibration, modification of the "g" level, angle); and gyroscopes, which are another kind of inertial sensing system, are made of an inertial mass which is rotated about one of its axes of inertia and the measurement relies on the relative movement between the axis and the base of the instrument, or on the force generated by the axis on the base of the instrument, when the base is subject to an external movement.

The limitation of all those inertial sensing systems is mainly due to friction between the inertial mass and the base of the instrument.

Indeed this friction is responsible for imprecise measurement, of wear between the mechanical parts in contact, and it might also lead to failure due to mechanical fatigue.

In addition inertial sensing systems, such as seismometers in seismology or inclinometers in civil engineering, are often placed to monitor structures or machines and the power consumption of such systems is sometimes a critical factor.

Hence there is a need to make non-contact (contact less) inertial sensing systems with little energy consumption.

One way to answer this problem is to use diamagnetic levitation, which is the only stable passive (no energy input) levitation at room temperature: diamagnetic materials are repelled by magnetic fields. If the magnetic field is created by permanent magnets, a piece of diamagnetic material can thus be passively and stably levitated.

In the U.S. Pat. No. 3,831,287 a tiltmeter is designed using diamagnetic levitation but without axial contact-less stabilization of the diamagnetic inertial mass. The diamagnetic force exerted over the inertial mass is created by a 1D arrangement of large horseshoe magnets resulting in an unstable levitation in the axial direction.

In the U.S. Pat. No. 5,396,136 an array of permanent magnets is levitated by magnetic interaction with a diamagnetic material (pyrolitic graphite).

In such a configuration magnets are heavier than graphite for the same volume of material, and diamagnetic materials (such as pyrolitic graphite) is much more expensive than magnets for the same volume of material (or for the same weight). In addition such a stabilisation, using a bowl shape diamagnetic material, is not active and would not, if used as a sensor, behave with the high sensitivity of a force balance inertial sensing system such as the ones of the present invention.

Other prior art references are listed below:

R. Moser, J. Sandtner, H. Bleuler, Diamagnetic Suspension System for Small Rotors, Journal of Micromechatronics, Vol. 1, N°2, 2001.

R. Moser, J. Sandtner, H. Bleuler, Diamagnetic Suspension Assisted by Active Electrostatic Actuators, $6^{th}$ International Symposium on Magnetic Suspension Technology, Oct. 6, 2001.

R. Moser, Y-J. Regamey, H. Bleuler, Passive Diamagnetic Levitation for Flywheels, ISMB, Sep. 24, 2002.

R. Moser, F. Barrot, H. Bleuler, Optimization of Two-Dimensionnal Permanent Magnet Arrays for Diamagnetic Levitation, MAGLEV, Sep. 9, 2002.

Science Toys, Levitating Pyrolitic Graphite: http://www.scitoys.com/scitoys/scitoys/magnets/pyrolitic graphite.html July 2002.

SUMMARY OF THE INVENTION

The present invention relates to a sensor and to a bi-directional actuator.

Advantageously, the present invention combines the use of diamagnetic levitation and electrostatic actuators to create highly sensitive non-contact inertial sensing systems based on the magnetic levitation of a diamagnetic body over a two-dimensional permanent magnet array.

In the invention a diamagnetic element is facing a two dimensional planar array of permanent magnets and thus, when the bi-dimensional array of magnets is placed horizontally, the diamagnetic element floats above the 2D arrangement of magnets. The magnets are arranged in such a way (for instance: opposite polarities for neighbouring magnets) that the diamagnetic force exerted by the array of magnets overcomes the weight of the diamagnetic element.

Preferably the relative horizontal position between the inertial mass and said array of magnets is sensed with one or several non-contact position sensors; This position information is then used to maintain or to move, with the use of non-contact electrostatic actuators, the diamagnetic element at a precise position above the array of magnets.

To move the diamagnetic element, electrostatic forces are created by at least 3 electrostatic actuators and the diamagnetic material is part of an electrode that is common to all said electrostatic actuators. The other electrode of each electrostatic actuator is made of a non-ferromagnetic material.

As for the said common electrode, if, for instance, a disc shaped diamagnetic material is considered, the diamagnetic material will be inserted inside a non-ferromagnetic ring shaped metal or a ring shaped electret (that can be precharged by electrostatic charges). The association of the diamagnetic disc and the ring shaped metal (or ring shaped electret) constitutes the common electrode of the said electrostatic actuators and also constitutes the inertial mass used in this invention.

Of course the shape of the diamagnetic material and the corresponding non-ferromagnetic metallic surface (or electret surface) that will transform the said diamagnetic mass into said common electrode, can be freely chosen.

Of course the invention comprises a mechanical base to hold together the previously mentioned components.

In a preferred embodiment the invention comprises a feedback loop incorporating the electrostatic actuators, the non contact position sensors, a signal conditioning unit for the sensors, a high voltage power supply, and a controller which computes the amount of voltage to apply to the independent electrodes of the said electrostatic actuators in order to maintain the inertial mass at a predefined position. Moreover the invention may comprise a signal processing unit that can be the same unit used for the controller or a separate unit.

When a relative movement of the base occurs (due to an acceleration, a tilt, etc. . . . ) the controller applies to the electrodes a voltage that is proportional to the disturbance (acceleration, angle).

It is preferable to measure differentially the position of said inertial mass. This can be done using a unique sensor with several sensing unit or using two identical non-contact position sensors facing two opposite sides of the inertial mass.

In addition, if a disc (or cylindrical) shape diamagnetic element is used with a ring (or cylindrical) shape electret (the electret can be pre-charged), and if each of the three (at least) electrodes facing the electret is made of, at least, three alternating comb electrodes, then a motor function can be implemented in order to spin the inertial mass about its main inertial axis.

When the relative displacement between the inertial mass and the array of magnets is due to an external perturbation (such as a vibration, a tilt, a variation in the level of g) then the voltage applied to the electrostatic actuators in order to keep in place the inertial mass is proportional to the intensity (acceleration, angle) of the applied perturbation.

Two-dimensional accelerometers (or seismometers), two dimensional tiltmeters (inclinometer) or gravimeters can be designed on such a concept.

Hence various small inertial sensing systems made of low cost components can be designed on this same basic embodiment (implementation) requiring mainly changes in the signal processing part.

In addition such an invention can also be used as a small X-Y actuator to move light objects with very small (less than a 1000 micrometer) and precise displacement (less than 50 nanometer depending on the sensitivity of the non contact distance sensors used). To do so, one only needs to give a varying order to the position controller instead of giving it a fixed position order.

Besides a feedback loop along a direction Z, orthogonal to the X-Y plan of the magnet array, incorporating a Z actuator, as well a Z position sensor, can be added to the system.

The total absence of contact is the main advantage of the present invention since it allows high sensitivity and high accuracy measurements.

Furthermore, in such an approach, friction problems are overcome without spending much energy since the inertial mass is both:
 levitated passively (without energy input) over the base of the instrument using diamagnetic levitation
 and maintained at a precise position, adopting the force balance concept for inertial sensing systems, with the use of electrostatic actuators.

BRIEF DESCRIPTION OF THE DRAWINGS

For a better understanding of the nature and objects of the invention, reference should be made to the following detailed description and the accompanying drawings, in which:

FIG. 8 shows a side view of a diamagnetic material in a 5 degrees of freedom levitation over a 2D Halbach array of permanent magnets, with magnetic field lines with:
 18) Magnetic field lines FIG. 9 shows a side view of a diamagnetic material in a three degrees of freedom levitation over a 2D Halbach array of permanent magnets, with magnetic field lines.

DETAILED DESCRIPTION OF THE INVENTION

Figure 1:
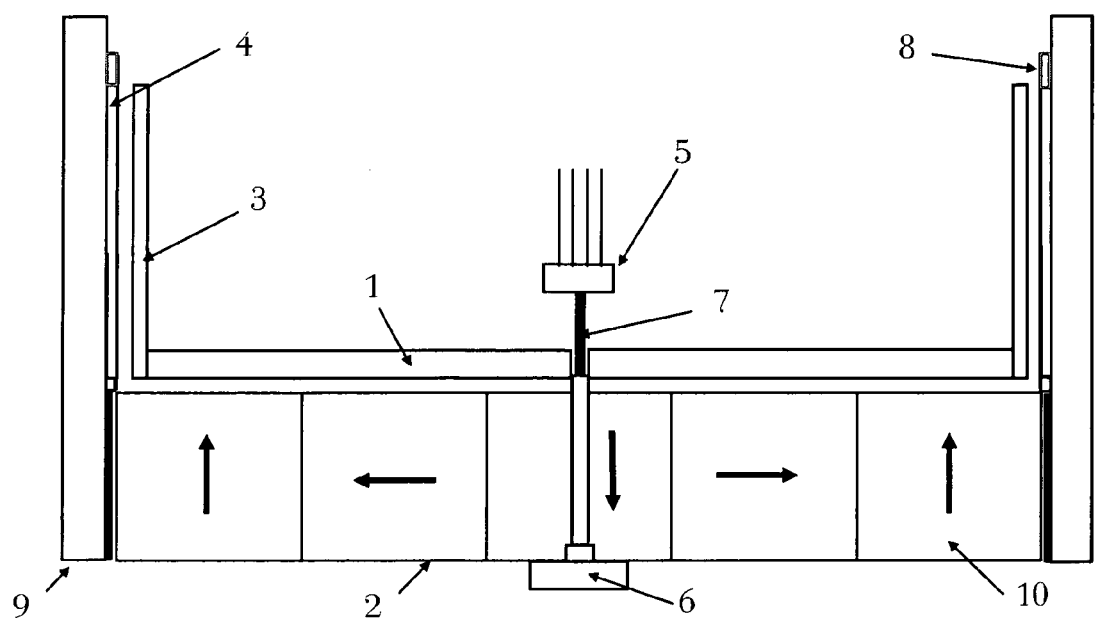
FIG. 1 shows a cut side view of the inertial sensor system with:
 1) Diamagnetic disk
 2) 2D arrangement of permanents magnets
 3) Aluminum crown
 4) Copper electrode
 5) Optical sensor
 6) Infrared LED
 7) Infrared beam passing through a hole in the diamagnetic disc and a hole in the array of magnets
 8) Isolating layer
 9) Structural support
 10) Magnet with its polarity FIG. 2 explains the position control of the diamagnetic disc with:
 11) Electrostatic actuator (Copper Electrode+aluminum crown)
 12) Controller
Figure 2:
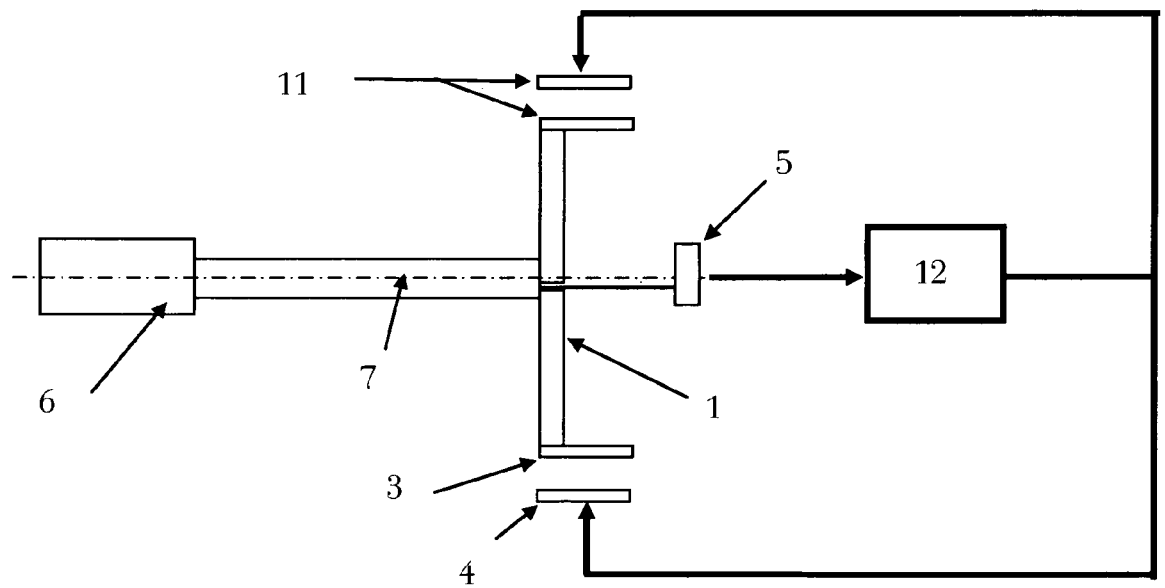
Figure 3:
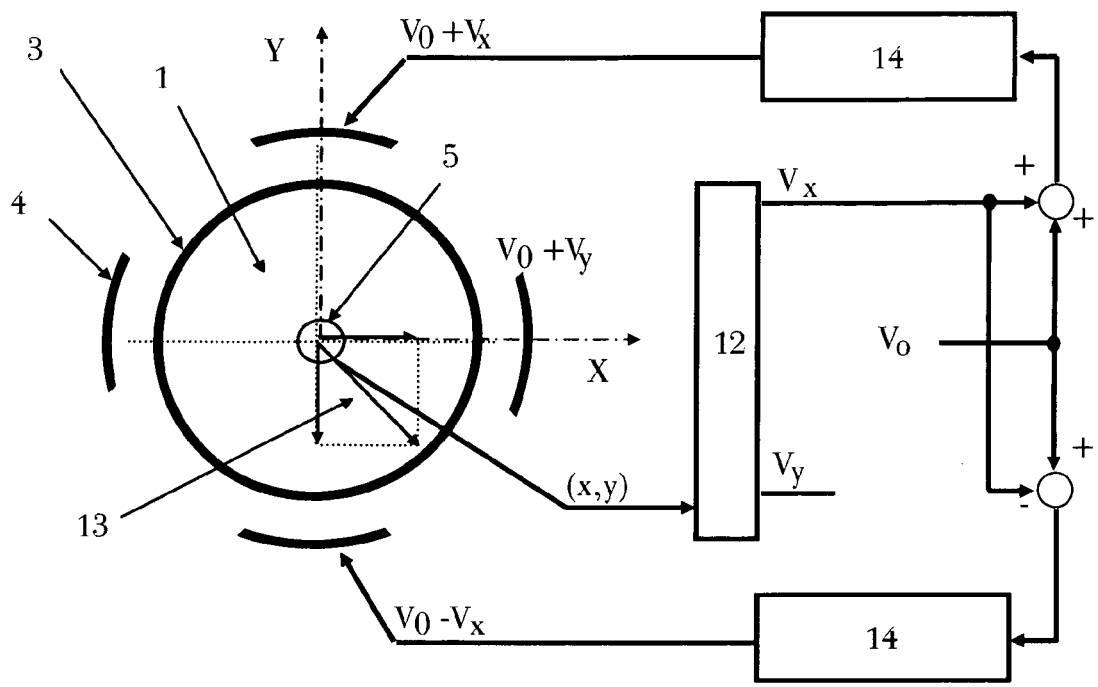
FIG. 3 shows details of the position control of the diamagnetic disc in differential mode (for $V_y$ the procedure is the same as for $V_x$) with:
 13) Electrostatic force exerted on the diamagnetic disc by the electrostatic actuators
 14) Voltage amplifier FIG. 4 explains the signal conditioning of the 4 segments sensor that can be used in the inertial sensing system. $i_A$, $i_B$, $i_C$, $i_D$ are the currents which are proportionals to the illuminated surface and to the intensity of the spot. With:
 15) Infrared spot

Several kinds of precision instruments can be designed on the principle of a diamagnetic material levitated over a 2D array of permanent magnets and kept in a precise position with electrostatic actuation.

We will describe a preferred embodiment (cf FIG. 1, FIG. 2, FIG. 3, FIG. 4, FIG. 7) that can be used as:
 A bidirectional acceleration sensor or a bi-directional seismometer
 A bi-directional tiltmeter (inclinometer)
 A gyroscope with the addition of an alternating voltage applied on comb electrodes 20 and 21 (FIG. 11) instead of the plain electrodes 4 (or 4' and 4").

A bidirectional actuator.

A gravimeter.

In the preferred embodiment described in FIG. 1, FIG. 2, FIG. 3, FIG. 4, and FIG. 7, a diamagnetic disc 1 is surrounded with a cylindrical aluminum crown 3 and is levitated over a Halbach-2D array 2 (cf. FIG. 13.f) of permanent magnets 10.

Figure 10:
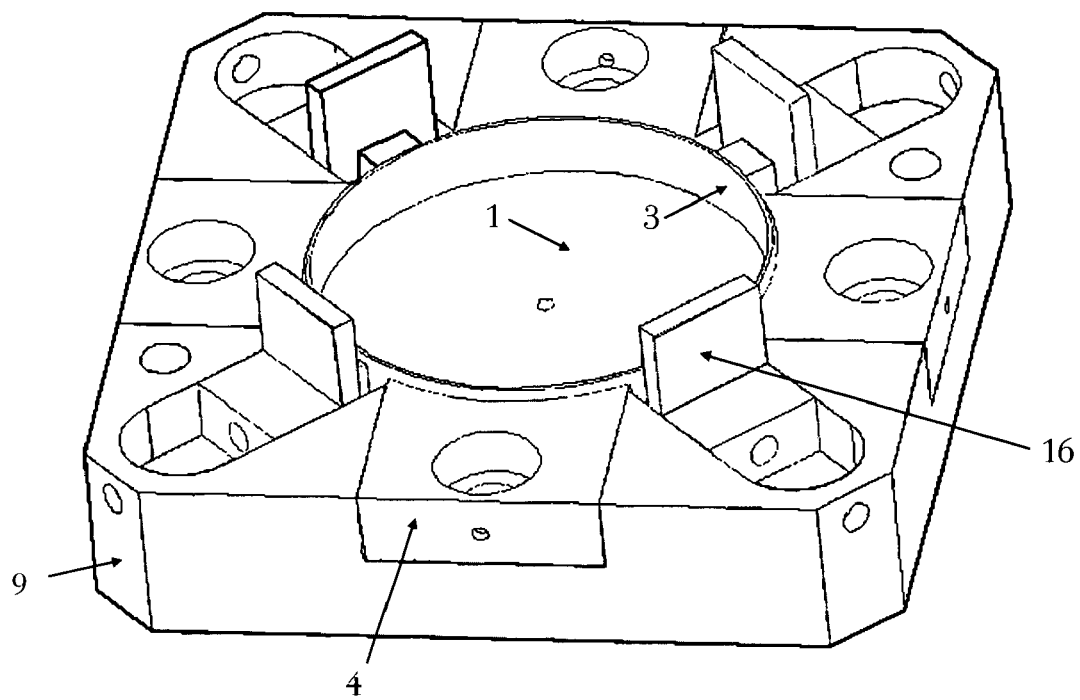
FIG. 10 shows the implementation of the inertial sensor with 2 pairs of non contact distance sensors with:
 16) Displacement sensor

The position of the disc 1 is controlled in a feed-back loop. This feed-back loop is made of:

- 2 pairs of electrodes 11 made by the association of the aluminum crown 3 and copper electrodes 4. The four electrostatic actuators are diametrically disposed in pairs along two orthogonal axis. One of the electrode of such actuators is the cylindrical aluminum crown 3 and the other electrode of each actuator, has a cylindrical shape as seen on FIG. 3, FIG. 7 and FIG. 10.
- a 4 segments optical sensor 5 spotted by an infrared LED 6-7-15 through the diamagnetic disc 1 and through 2.
- and a digital controller 12 that generates the required voltages (FIG. 2 and FIG. 3) to the 2 pairs of electrodes 11 (or 4+3) in order to maintain (thanks to the generated electrostatic forces 13) the diamagnetic disc 1 at a predefined position when it is subjected to motion (due to shaking in case of a seismic sensor, or due to angular displacement in case of an X-Y tiltmeter, or due to a variation of g in the case of a gravimeter).

In the case of, for instance, the seismometer application, the forces 13 generated by the control 12 (or the voltages applied to the electrodes 4) are proportional to the soil accelerations.

Figure 4:
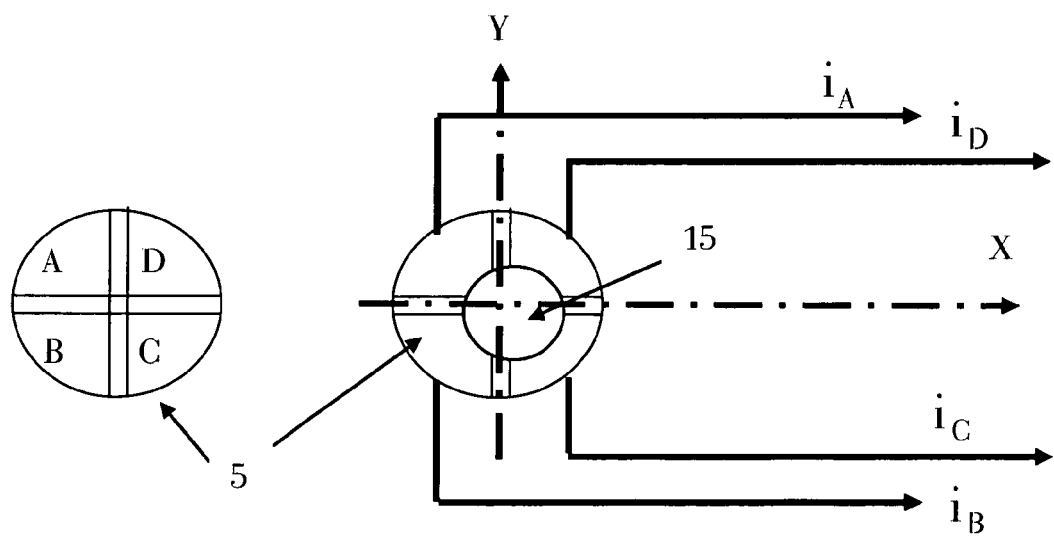

As we can see in FIG. 4 the measurements (X and Y) with the four segments optical sensor 5 are differential.

The advantage of such a differential measurement is that it cancels out the effect of temperature (or pressure or humidity . . . ) variations.

Of course we can also use 2 pairs of position sensors 16 (FIG. 10) (facing each others around the aluminum disc 1, cf FIG. 10) and we would also have differential measurements: subtracting the output signal of two diametrically opposite sensors 16 gives the position information of the inertial mass 1+3 along the direction defined by the two said diametrically opposite sensors 16.

The sensors 16 are non-contact position sensors; they can be optical reflection sensors, eddy current sensors, capacitive sensors (with a comb structure for instance) or interferometric sensors.

Of course, a signal-conditioning unit is needed for the non-contact position sensor(s) 5 or 16 and also a high voltage power supply or a high voltage amplifier 14, with at least two inputs and four outputs, is needed to apply high voltage (with very low currents) to the electrodes.

If a feedback loop along a direction Z, orthogonal to the X-Y plane of the magnet array, incorporating a Z electrostatic actuator, as well as, at least, one Z position sensor (facing one of the face of the inertial disc), is added to the inertial sensing system embodiment described previously, then the whole system becomes an X-Y-Z actuator and the high voltage amplifier needs an additional input and an additional output. The Z actuator consists of at least one electrostatic actuator made of the diamagnetic disc 1 and the array of magnets 2 on which a high voltage is applied in order to attract the diamagnetic disc.

Such an actuator can be used as the scanning module for an Atomic Force Microscope probe. The AFM probe is fixed in the centre of the diamagnetic disc 1 and points downward, towards the array of magnets 2. Just under the AFM probe, a magnet of the magnet array 2 has been removed from the magnet array 2 and the element to be scanned is positioned inside the hole left by the missing magnet;

Such a triaxial actuator (X-Y-Z) can also be used as a precise positioning unit that can, for instance, be incorporated in a larger X-Y table.

The preferred arrangement for inertial sensing systems, or for bi-directional or tri-directional actuators, is a 2D (such as Halbach 2D or opposite 2D) array of magnets.

Figure 5:
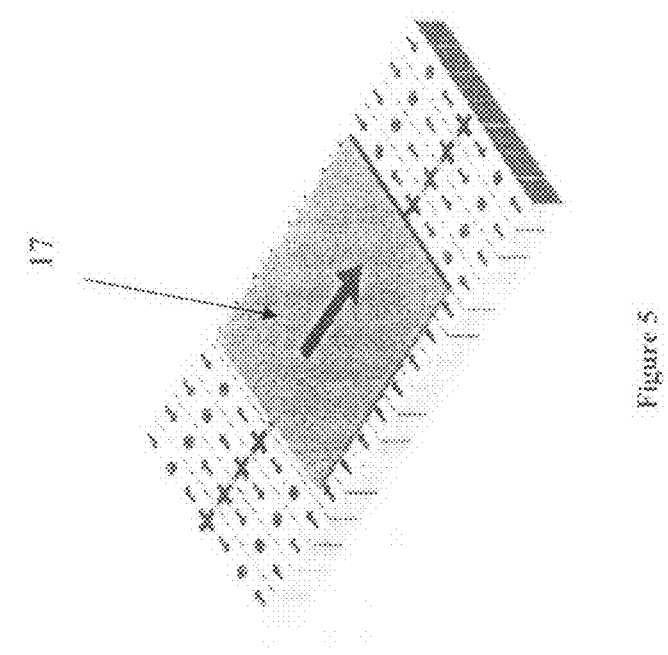
FIG. 5 shows a linear drive made of a diamagnetic material over a 1D Halbach array of magnets with:
 17) Diamagnetic material

Indeed, depending on both the shape of the inertial mass 1+3 and the shape of the 2D magnet array FIG. 5, FIG. 6, FIG. 7, FIG. 8, FIG. 9, several kinds of stabilisation of the inertial mass can be achieved:

- In FIG. 5 the diamagnetic material 17 has a rectangular shape and is stably floating over a Halbach 1D. Such a configuration is especially well adapted to design a linear diamagnetic drive that can, for instance be used to convey small spare parts in a microfactory.
- In FIG. 6 the diamagnetic material 17 has a square shape and is in a six degree of freedom stable and passive levitation over a Halbach 2D array of permanent magnets. This configuration is illustrated in FIG. 8.

Figure 7:
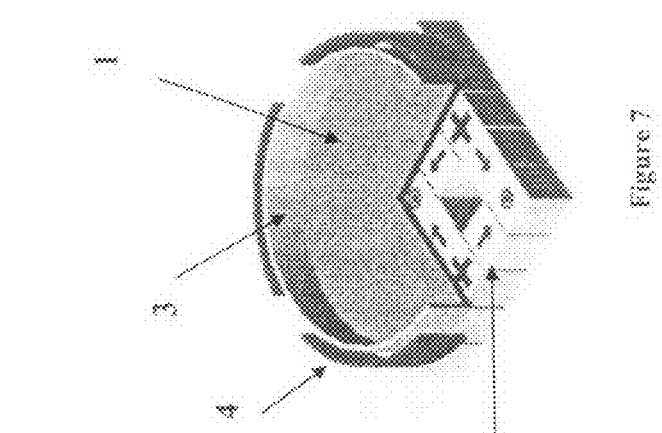
FIG. 7 shows an unstable contact-less suspension with active electrostatic actuators (diamagnetic disc with its aluminum crown and its electrostatic electrodes over a 2D Halbach array of permanent magnets).
Figure 6:
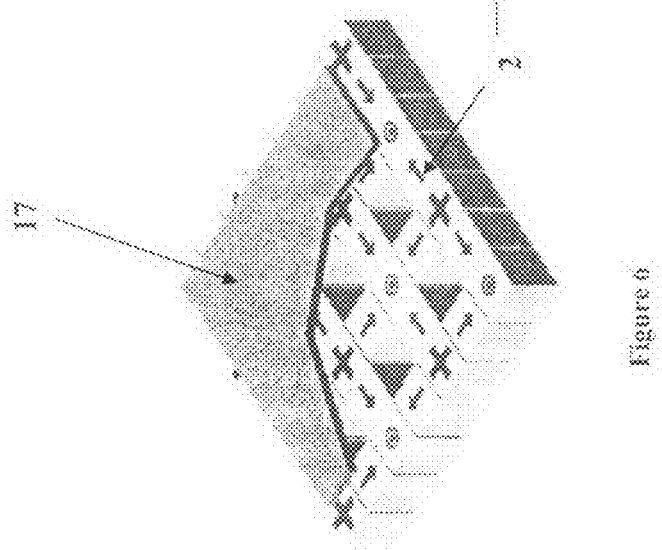
FIG. 6 shows diamagnetic material in a 6 degrees of freedom stable levitation over a 2D Halbach array of permanent magnets.

In FIG. 7 the diamagnetic disc 1 with an aluminium crown 3 constitutes an unstable contact-less suspension which is radially stabilized with active electrostatic actuators 3+4. This configuration corresponds to the configuration illustrated in FIG. 9. Such a configuration is well adapted to the design of inertial sensing system as described in the present invention.

Figure 13:
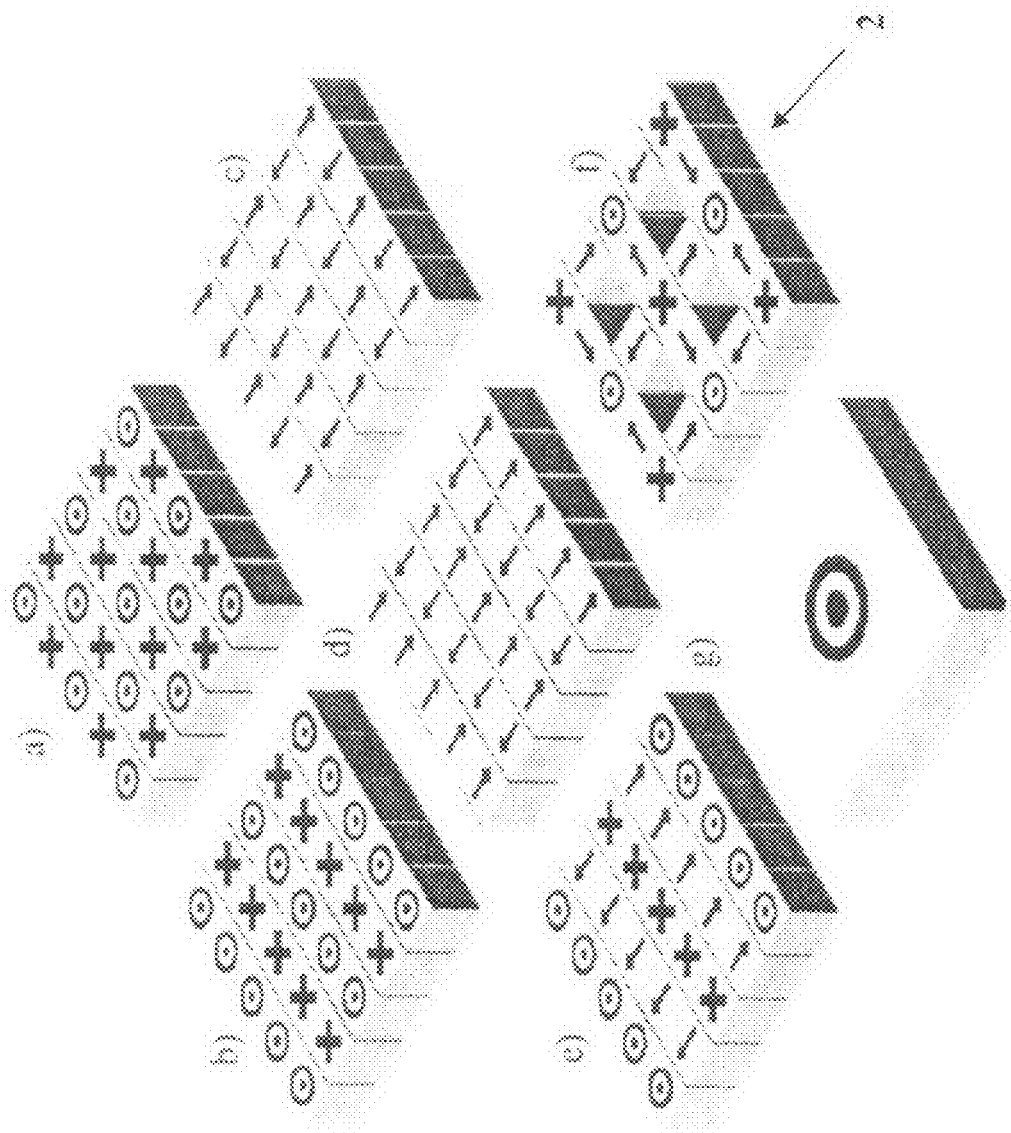

As for the 2D magnet array it does not have to be a Halbach 2D array (2 or FIG. 13.f), it can be any of the possible magnets arrays shown in FIG. 13. The Halbach 2D array (2 or FIG. 13.f), is the one which produces the largest diamagnetic force among all those arrays; but, for instance, an opposite 2D array FIG. 13-a of magnets can also be used and it is auto-stable (that is to say: no glue is needed for the assembly of this array) by opposition to the Halbach 2D array (2 or FIG. 13.f).

Except for the use of this inertial sensor as a gyroscope, the shape of the inertial mass 1+3 does not have to be a disc nor a cylinder; it can be a parallelepiped, a triangle or a square for instance.

Figure 11:
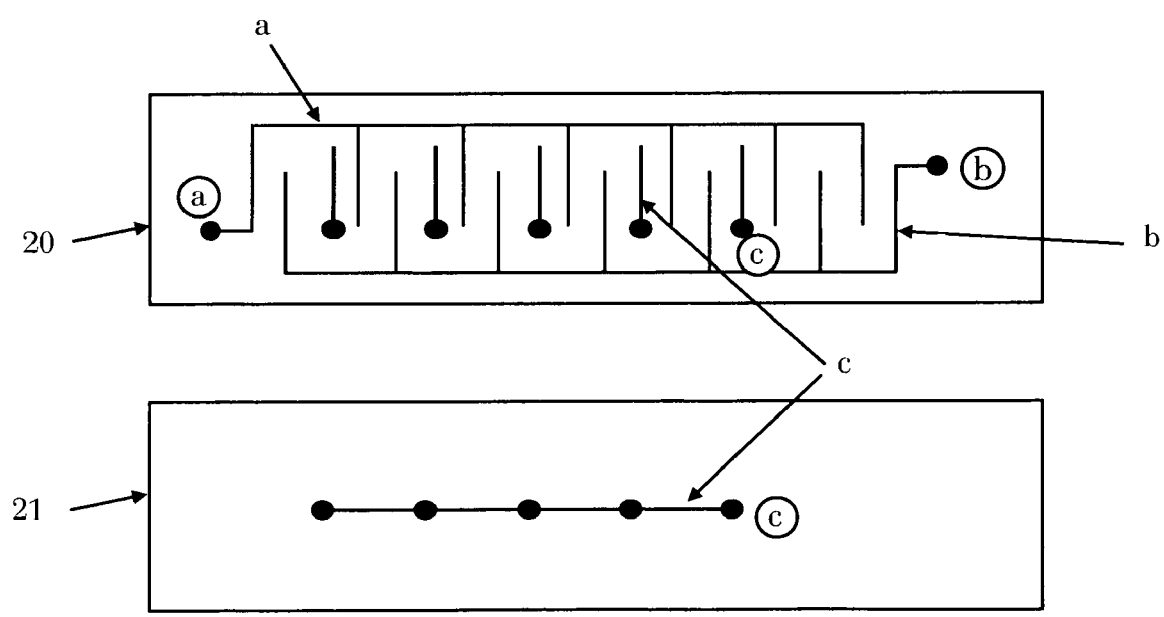
FIG. 11 shows a sketch of the electrode used to create a 3 phases alternating electric field in the gyroscope application with:
 a) Phase 1 electrode
 b) Phase 2 electrode
 c) Phase 3 electrode
 20) Front view of the 3 phases electrode
 21) Back view of the 3 phases electrode

To be used as a gyroscope, some small changes have to be applied to the preferred embodiment:

- The aluminium crown 3 is replaced by an electret crown that can be pre-charged or not.
- The plain copper electrodes 4 are replaced by comb shaped electrodes 20-21 with at least three phases as described in FIG. 11. The inertial mass 1+3 rotates when a rotating electric field is applied to such electrodes
- Some additional plain electrodes 4' (cf. FIG. 12), facing towards the inner surface of the electret crown can be added to better stabilize the axial movements of the inertial mass.

Of course the place of the plain electrodes 4' and the comb shaped electrodes 20-21 can be inverted; that is to say the plain electrodes 4' (cf.FIG. 12), points towards the outer surface of the electret crown and the comb shaped electrodes 20-21 point towards the inner surface of the electret crown.

The electrodes 4 do not have to be made of copper but they should be made of a non-ferromagnetic metal. Indeed, the electrodes 4 being placed next to the array of permanent magnets 2, the flux line 18 of the later 2 would be severely modified if the electrodes 4 where made of a ferromagnetic material. In addition, an insulation layer 8 is needed on electrodes 4-4'-4" or on the aluminum crown 3 in order to avoid short circuits when the inertial mass 3+1 is in contact with more than one electrode 4.

The number of electrostatic electrodes needed to conceive inertial sensing systems as described on this invention, could be reduced to 3; the control would be a little bit more complicated than with 4 electrodes but the high voltage power supply stage would only need 3 independent outputs whereas it needs 4 independent outputs in the 4 electrodes embodiment.

Figure 12:
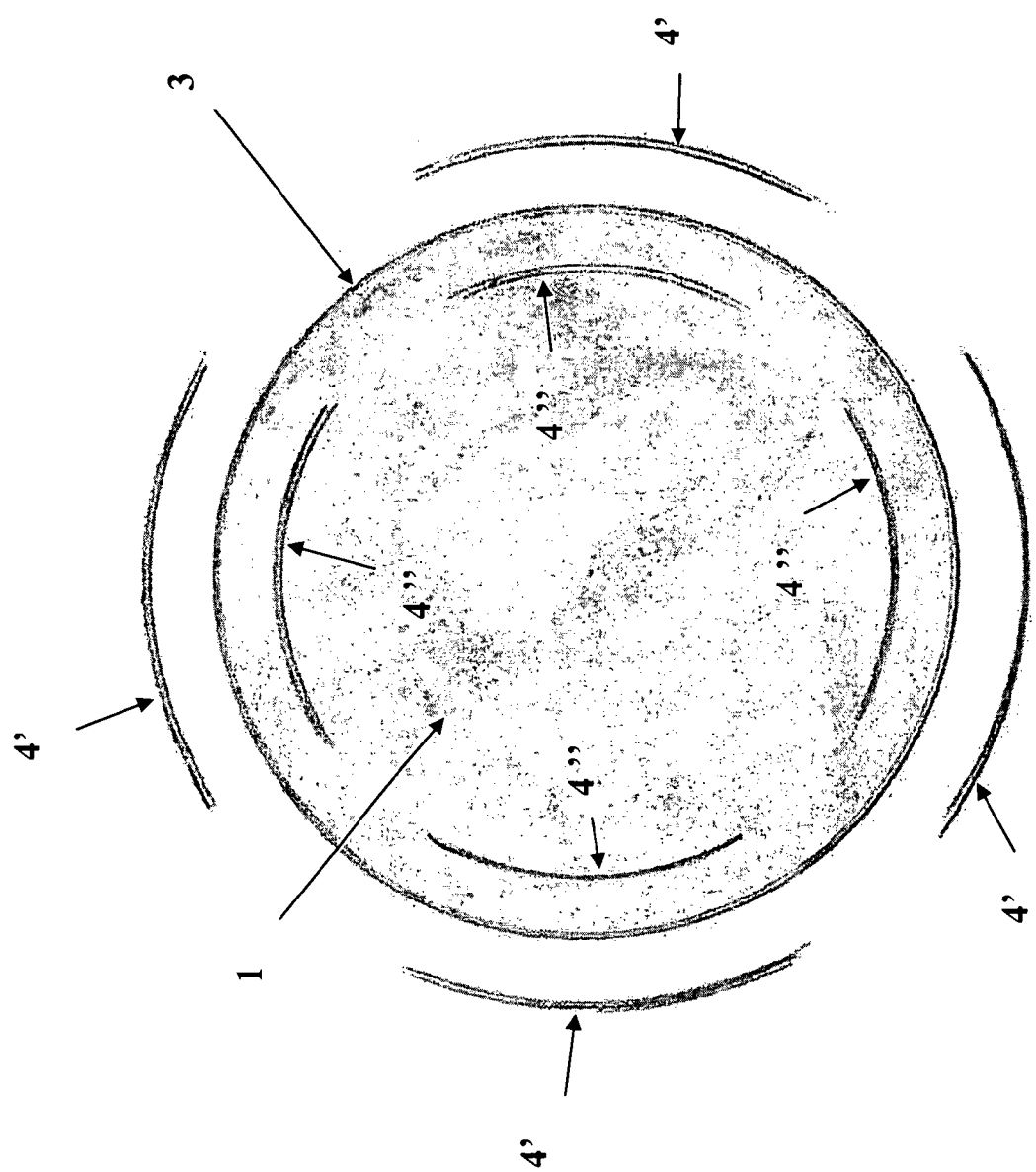
FIG. 12 shows a top view of an inertial disc shaped mass with two orthogonal pairs of double electrodes with:
 4') Inner copper electrode
 4") Outer copper electrode FIG. 13 Possible magnets arrays for diamagnetic levitation, a) Opposite 2D b) Opposite 1D, c) Repulsive 2D, d) repulsive 1D, e) Halbach 1D f) Halbach 2D g) reference magnet.

Moreover the electrostatic force exerted on the inertial mass can be doubled by using double electrodes as illustrated in FIG. 12. In such a configuration the voltage applied to an inner copper electrode 4" is the same as the voltage of the diametrically opposed outer electrode 4'.

As for the crown 3, it does not have to be made of aluminum, it can be made of an electret (pre-charged or not) or a non-ferromagnetic metal.

Indeed, the crown 3 cannot be made of ferromagnetic metal because, otherwise, it would be attracted towards the magnet array and it would cancel the diamagnetic force as well as the diamagnetic levitation.

The main parameters of this inertial sensing system, such as the equivalent rigidity and damping of the electrostatic actuators, can be varied by changing numerical values in the digital controller. Hence the bandwidth of the sensor is user selectable. In addition some pre-processing or processing tasks can be implemented directly in the digital controller and the results can be saved in a data storage component.

In addition with the adjunction of a compensating magnet a bigger body can be diamagnetically levitated and other apparatus such as flywheel can be designed or larger inertial masses can be used for the inertial sensor of the present invention.

Everything that has been previously said about the inertial sensing system application can also be applied for the bi-directional X-Y and tri-directional X-Y-Z actuator.

The precision of the measurements will mainly depend on the electronics used (resolution and sensitivity of the sensor, number of bits of the AD converters, number of bits used in the controller, etc. . . . );

and if a void is utilized inside the system, it can also enhance the precision of the measurements.

The invention claimed is:

1. An inertial sensor based on diamagnetic levitation,
    said inertial sensor comprising a two dimensional array of permanent magnets and a diamagnetic element facing the said array,
    wherein said diamagnetic element constitutes an inertial mass,
    wherein the inertial sensor senses inertial forces, and
    wherein the inertial sensor further comprises a feed-back loop incorporating:
    at least 1 non contact position sensor to detect the movements of said inertial mass,
    at least 3 electrostatic actuators for keeping in place or moving said inertial mass, and
    computing means to derive the force exerted on a support and for moving or keeping in place said inertial mass accordingly;
    wherein said electrostatic actuators have one common electrode which is physically sealed to said inertial mass, the other electrode of each said electrostatic actuator facing and partly surrounding, or being partly surrounded by, said common electrode.

2. An inertial sensor according to claim 1 wherein said array is a bi-dimensional arrangement of permanent magnets called "Halbach 2D" wherein:
    some of its constituting magnets are pointing in a direction Z orthogonal to the XY plan defining said array,
    the magnetic field lines are mostly concentrated on one side of the said array and with very few magnetic field lines on the other side of said array,
    along each of the two directions X and Y defining said "Halbach 2D" array of permanent magnets, one can see linear Halbach arrangements of permanent magnets: the polarities of adjacent magnets (along one direction) differ by an increment of 90°,
    in order to avoid breaking the symmetry of the flux lines there are some missing magnets in the said array, and those missing magnets are located along directions parallel to the X+Y direction of the said magnet and in between 2 magnets with the same vertical polarisation.

3. An inertial sensor according to claim 1 comprising:
    two pairs of electrodes,
    a four segments optical sensor,
    a LED or laser source,
    wherein said inertial mass is a disc of diamagnetic material surrounded by an aluminum crown thus constituting said common electrode; and
    wherein said pairs of electrodes are diametrically facing said aluminum crown, each said pair of electrodes being placed orthogonally to the other pair of electrodes;
    wherein said four segments optical sensor and said LED or laser source are respectively facing an opposite face of the surface delimited by said inertial disc shaped mass; and
    wherein said inertial mass has a hole in its centre from which the light of said LED or laser source is spotting on said 4 segments optical sensor.

4. An inertial sensor according to claim 1 comprising:
    two pairs of electrodes,
    two pairs of non-contact position sensors,
    wherein said inertial mass is a disc of diamagnetic material surrounded by an aluminum crown thus constituting said common electrode;
    wherein said pairs of electrodes are diametrically facing said aluminum crown, each said pair of electrode being placed orthogonally to the other pair of electrode; and
    wherein said pairs of non-contact position sensors are diametrically facing said aluminum crown, each said pair of electrode being placed orthogonally to the other pair of electrode.

5. A bi-directional non-contact accelerometer or a bi-directional non-contact seismometer comprising an inertial sensor according to claim 1, wherein the sensor comprises a means for detecting motion of the diamagnetic elements in two directions in response to bi-directional acceleration.

6. A non-contact bi-directional inclinometer or tiltmeter comprising an inertial sensor according to claim 1, wherein the sensor comprises a means for detecting motion of the diamagnetic element so as to detect inclination or tilt.

7. A non-contact gravimeter comprising an inertial sensor according to claim 1, wherein the sensor comprises a means for detecting motion of the diamagnetic element so as to detect gravity.

8. An inertial sensor according to claim 1 wherein said inertial mass has a cylindrical shape;
    wherein said electrostatic electrodes are positioned regularly spaced on the surface of a cylinder facing said common electrode of said electrostatic actuator; and wherein said common electrode of said electrostatic actuators is covered by a layer of pre-charged electret and the other electrode of each of said electrostatic actuator is made of at least three independent electrostatic alternating combs so as to create a rotating electric field that can spin said inertial mass.

9. A non-contact gyroscope comprising an inertial sensor according to claim 8, wherein the sensor comprises a means for detecting motion of the diamagnetic element so as to detect orientation.

* * * * *